Jan. 23, 1923.

A. J. HARDER.
TRACTION WHEEL.
FILED JULY 12, 1921.

1,443,076

WITNESSES
Frederick Diehl.
R. W. Savage

INVENTOR
A. J. HARDER
BY
ATTORNEYS

Patented Jan. 23, 1923.

1,443,076

UNITED STATES PATENT OFFICE.

ANDREW JOHN HARDER, OF WEST WATERTOWN, SOUTH DAKOTA.

TRACTION WHEEL.

Application filed July 12, 1921. Serial No. 484,119.

*To all whom it may concern:*

Be it known that I, ANDREW J. HARDER, a citizen of the United States, and a resident of West Watertown, in the county of Codington and State of South Dakota, have invented a new and Improved Traction Wheel, of which the following is a full, clear, and exact description.

This invention relates to an improved traction wheel for use with traction engines or the like.

Prior to this invention traction wheels of open construction when used in soft ground became clogged and gave considerable trouble during operation. Another disadvantage was that they did not have a circular bearing surface and consequently did not ride smoothly on hard ground.

The object of this invention is to provide an improved form of traction wheel of open construction that will not become clogged when used in soft ground and which has a circular bearing surface that makes the machine ride smoothly on hard ground.

The construction of this traction wheel and its advantages will be more clearly understood from the following detailed description and reference to the accompanying drawings.

Figure 1:
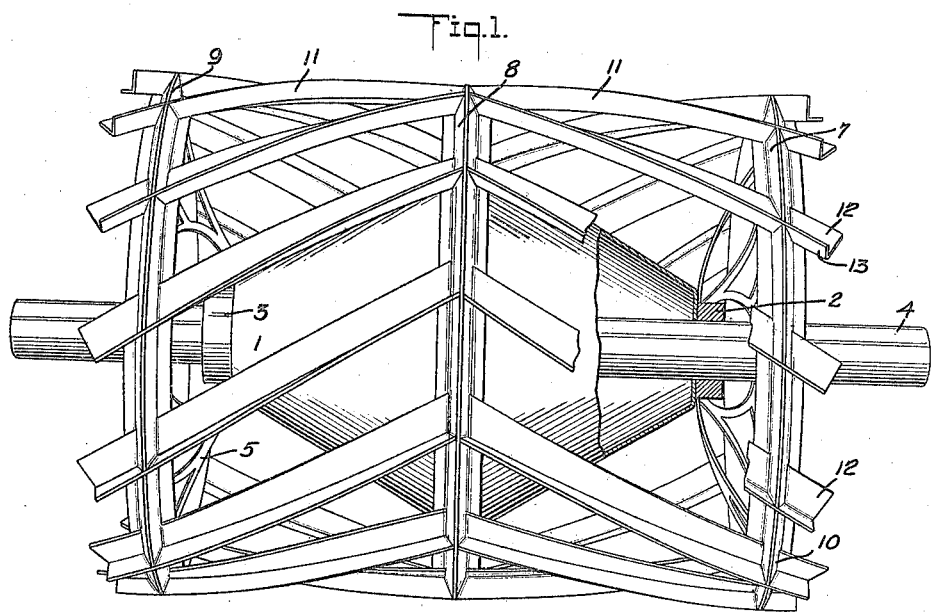
Figure 1 is an elevation of the improved traction wheel.
Figure 2:
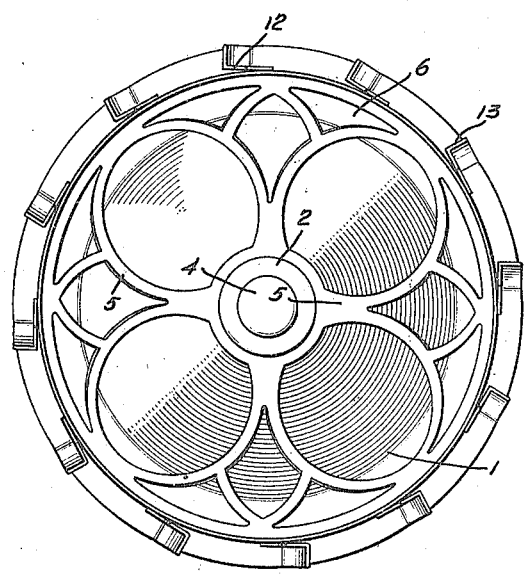
Figure 2 is an end view of the traction wheel.

Referring to the above-mentioned drawings, a hub 1, which is the shape of two conic frustums butted together, has axle boxes 2 and 3 fixed to the ends. The hub is made of this shape so that when the wheel is used in soft ground and the soil is pressed through the open wheel construction and into contact with the hub it is gradually forced along the hub to either end due to the weight of the machine used in conjunction with the wheel. A shaft 4 projects through the axle boxes 2 and 3 and is fixed thereto. Radiating from the ends of the hub are spokes 5 which are curved outwards. These spokes are curved outwards so as to give greater strength to the wheel when it is used in stony ground or on the sides of hills. They also allow the hub to be made shorter, and this allows a greater slope which assists in expelling the soil from the wheel. A flange 6 extends radially outwards around the greatest circumference of the hub. Mounted on the spokes and flange 6 are V-shaped rims 7, 8 and 9. The apex of the rims 7, 8 and 9 face outward so that the rims do not hold the soil. Slots 10 are provided in the rims 7, 8 and 9. Mounted in these slots are angle bars 11. These angle bars are diagonally mounted with respect to the rims and have their inner ends leading. The legs 13 of the angle bars 11 extend radially outward while the legs 12 extend approximately at right angles to the legs 13. The leg 12 lies in front of the leg 13 so as to strengthen the latter to withstand the force applied. These bars 11 are also slightly curved so as to give a smooth bearing surface when the machine is used on hard ground.

Modifications of this wheel construction may be made. Narrow wheels of this construction may be built where two wheels are used for traction instead of the single wheel described above.

Having thus described my invention, I claim as new and desire to secure by Letters Patent:

1. As a new article of manufacture, a traction wheel of the class described, comprising openwork tread means, means for supporting said tread means, and a hub the shape of two conic frustums butted together, for forcing the soil passing through the tread means through the ends of the wheel, enclosed by said tread means and supporting means.

2. As a new article of manufacture, a traction wheel of the class described, comprising a hub the shape of two conic frustums butted together, an axle box fixed to each end of the hub, and a wheel frame carrying traction cleats supported on said axle boxes and hub.

3. As a new article of manufacture, a traction wheel of the class described, comprising a hub, an axle box attached to each end of the hub, tread supporting means in conjunction with the axle boxes and hub, and tread means including a plurality of spaced angle-shaped traction cleats diagonally positioned and mounted on the tread supporting means.

4. As a new article of manufacture, a traction wheel of the class described, comprising an open framework for carrying spaced traction cleats, a hub the shape of two conic frustums butted together positioned between two axle boxes which are fixed thereto, and supporting means in conjunction with the axle boxes and hub for supporting the openwork frame.

5. As a new article of manufacture, a traction wheel of the class described, comprising a hub so shaped that it forces soil coming in contact therewith towards its ends, an axle box fixed to each end of the hub, and an openwork frame having spaced cleats mounted thereon, carried by said axle boxes and hub.

6. As a new article of manufacture, a traction wheel of the class described, comprising an axle, a hub having an axle box fixed to each end attached to the axle, tread supporting means in conjunction with the hub and axle boxes, and traction cleats diagonally mounted on the supporting means with their inner ends leading, said traction cleats being curved so as to give the wheel a continuous circular bearing surface.

ANDREW JOHN HARDER.